United States Patent [19]

Tawara et al.

[11] Patent Number: 4,926,415
[45] Date of Patent: May 15, 1990

[54] LOCAL AREA NETWORK SYSTEM FOR EFFICIENTLY TRANSFERRING MESSAGES OF DIFFERENT SIZES

[75] Inventors: Kiyoshi Tawara, Ootawara; Masakazu Osada, Utsunomiya; Eitaro Nishihara, Ootawara, all of Japan

[73] Assignee: Kabushiki Kaisha Toshiba, Kawasaki, Japan

[21] Appl. No.: 152,301

[22] Filed: Feb. 4, 1988

[30] Foreign Application Priority Data

Feb. 4, 1987 [JP] Japan .................................. 62-23840
Feb. 7, 1987 [JP] Japan .................................. 62-26767

[51] Int. Cl.⁵ .......................................... H04Q 11/04
[52] U.S. Cl. ..................................... 370/60; 370/85.2; 370/85.9; 370/94.1
[58] Field of Search ....................... 370/85, 86, 88, 84, 370/60, 118, 85.2, 85.9, 85.11, 85.12, 85.15, 94.1, 94.3; 340/825.5, 825.05

[56] References Cited

U.S. PATENT DOCUMENTS

| | | | |
|---|---|---|---|
| 4,445,213 | 4/1984 | Baugh et al. | 370/94 |
| 4,535,448 | 8/1985 | Baxter et al. | 370/94 |
| 4,654,890 | 3/1987 | Hasegawa et al. | 370/85 |

FOREIGN PATENT DOCUMENTS 3215261 3/1989 Fed. Rep. of Germany .

OTHER PUBLICATIONS

"Ring Network Reliability and a Fault-Tolerant Cambridge Ring Architecture", T. N. Chen, Ph.D., Journal of the Institution of Electronic and Radio Engineers, vol. 55, No. 5, pp. 179-183, May 1986.

Primary Examiner—Joseph A. Orsino
Assistant Examiner—Frank M. Scotch, III
Attorney, Agent, or Firm—Oblon, Spivak, McClelland, Maier & Neustadt

[57] ABSTRACT

A network interface in a local area network system for transferring a message from a first terminal to a second terminal at high speed comprises a receiving section for receiving the message from the first terminal, a first sending section for sending the received message to a first network on the basis of a first control instruction, a second sending section for sending the received message to a second network on the basis of a second control instruction, and a network control section for detecting a message size of the received message and for outputting the first and second control instruction to the first and second sending section in accordance with the message size.

12 Claims, 14 Drawing Sheets

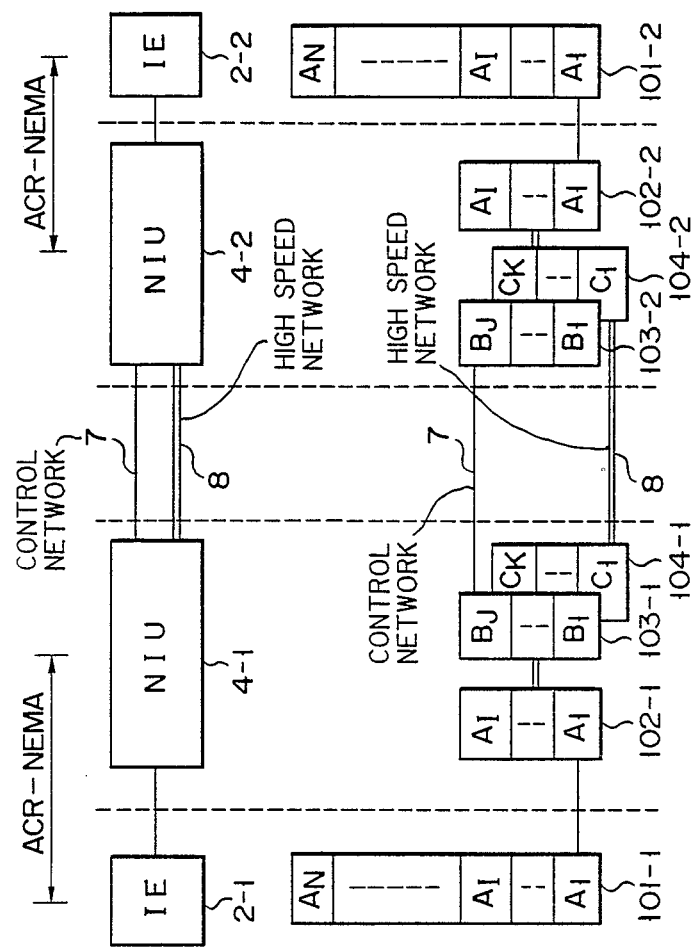
F I G. 5

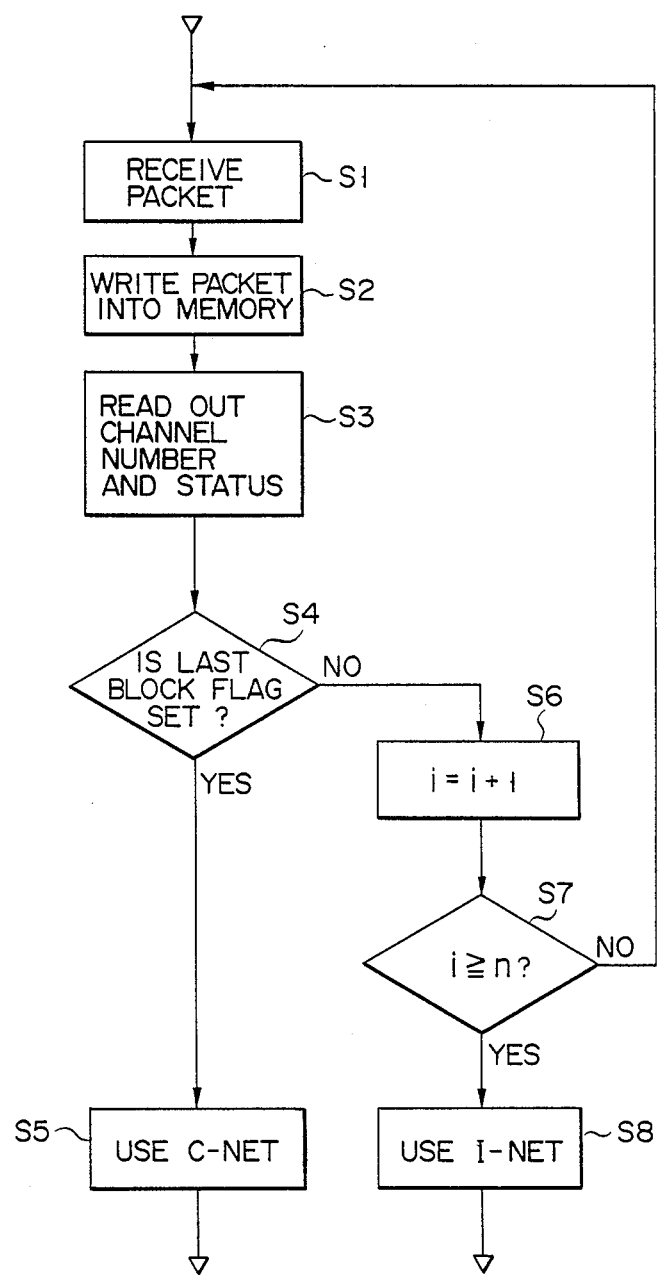
F I G. 13

LOCAL AREA NETWORK SYSTEM FOR EFFICIENTLY TRANSFERRING MESSAGES OF DIFFERENT SIZES

BACKGROUND OF THE INVENTION

The present invention relates to a local area network (LAN) constituted such that nodes each including at least one data terminal and a network interface unit are connected to networks having different characteristics, wherein a message can be transferred at high speed between the data terminals by means of packet switching, in accordance with a message size.

Computer systems and various other office automation (OA) apparatuses are very popular to improve working efficiency in offices and effectively utilize data and the like. At the initial stage of development, such apparatuses are used as stand-alone equipment at proper locations. However, this configuration does not allow apparatuses to be systematically connected and to be maximally used. Therefore, a local area network has received a great deal of attention as a system for connecting the apparatuses.

In a broad sense, the LAN system is a network in which computers, large-capacity memories, printers, monitor equipment, and control equipment, all being distributed in a relatively narrow area, are connected through transmission lines. In a narrow sense, the LAN system is a digital information communication network in an enterprise. FIG. 1 shows a conventional network of LAN system 6.

As is shown in FIG. 1, LAN system 6 comprises network manager NM, high-speed data transfer network 8, and control data transmission network 7, which is used to transmit control data or control data between nodes N1 to Nn constituted by computers or the like within buildings. Each of nodes N1 to Nn comprises at least one data terminal and one network interface unit NIU and performs data communication by means of packet switching system, i.e., one of the store and switching schemes. When a channel establishment request from a given data terminal is output through network interface unit NIU, a network manager NM establishes a channel in accordance with channel establishment requests from other data terminals. Network 7 is used to transmit control data representing the number of packets and the number of idle packets, and comprises a data transmission medium (e.g., coaxial cables or low-speed transmission optical fibers) for connecting nodes N1 to Nn. Network 8 is used to transmit a data packet, and comprises high-speed transmission optical fiber cables radially connected to nodes N1 to Nn with respect to star coupler 9 as the center of the network.

Each message is divided into data blocks, each having a length of a plurality of bytes, and is transmitted to a destination terminal in units of packets affixed with a destination number or the like. As is shown in FIG. 2, when a long message, such as X-ray image data, is to be transmitted from terminal 2-1 to terminal 2-2, control data is generated before and after the image data is transmitted from terminal 2-1. NIU 4-1 connected to terminal 2-1 determines whether the series of input transmission data is control data or image data. When the transmission data is control data, it is transmitted to network manager NM through network 7, thereby establishing a channel within network 8. When the channel is established in network 8, NIU 4-1 transmits image data to the destination terminal through network 8. When image data transmission is completed, the control data is transmitted again from terminal 2-1 to terminal 2-2 through NIUs 4-1 and 4-2. Thus, transmission of the image data in one execution cycle is completed.

In the case above mentioned, a data transmission rate is important. The conventional network system shown in FIG. 1 includes high-speed network 8 having a high transmission rate and low-speed network 7 having a low transmission rate. High- and low-speed networks 8 and 7 employ different protocols. When network 8 is used with a small data capacity, the data can be transmitted at high speed, as shown in FIG. 3A, but transmission time T2 including a setup time is long. When network 7 is used, as is shown in FIG. 3B, a long time is required to prepare and transmit the data, but transmission time T1 itself is short. Therefore, when a small amount of data is to be transmitted, protocol processing time T1 is shorter than protocol processing time T2.

When a large amount of data is to be transmitted, transmission time T4 required for use of network 8 is substantially the same as transmission time T2 required to transmit a small amount of data through network 8, as is shown in FIG. 3C. When a large amount of data is divided into units of a smaller units of data, and when these data units are transmitted through network 7, as is shown in FIG. 3D, transmission time T3 is considerably longer than transmission time T4, as is evident from FIG. 3C.

As described above, when the data is transmitted through network 8 regardless of the length of the transmission data, the control data transmission time is longer than the message data transmission time if the message transmission data is short. Therefore, networks 7 and 8 cannot be effectively utilized. For this reason, in a network for transmitting both large and small data blocks, e.g., in a medical image data storage communication system, transmission efficiency for transmitting a small data block is low in a high-speed network. And, transmission efficiency for transmitting a large data block is low in a low-speed network. A strong demand, therefore, has arisen for developing a LAN system capable of effectively transmitting data, on the basis of message sizes, through a plurality of networks having different data transmission rate characteristics.

SUMMARY OF THE INVENTION

The present invention has been made in consideration of the above situation, and has as its object to provide a network system capable of effectively transferring data having a large information capacity and data having a small information capacity at high speed between data terminals in accordance with packet switching.

The present invention is applied to a local area network in which a plurality of nodes each including at least one data terminal and a network interface unit are connected to a plurality of networks having different characteristics. The network system comprises a first network, a second network, a first network interface means, connected between the first and second networks and a first terminal, for selecting a message output from the first terminal on the basis of a size thereof and for transmitting the message to one of the first and second networks, and a second network interface means, connected to the first and second networks and a second terminal, for receiving the message from one of the first and second networks and for sending the message to the second terminal.

If the size of the message transmitted from the first terminal is small, the second network is used. Otherwise, the first network is used.

It is another object of the present invention to provide a transmission system having high data transfer efficiency. In this system, a plurality of communication protocols are prepared in the network interface unit so as to correspond to the plurality of networks, an optimal communication protocol is selected in accordance with a using state of the network, and the message is transmitted through the network corresponding to the optimal protocol.

According to the present invention as described above, there is provided a LAN system capable of effectively using a plurality of networks having different data transmission rate characteristics on the basis of the transmission data sizes.

Furthermore, a plurality of communication protocols are prepared for one type of message, and an optimal protocol can be selected in accordance with the occupying state of the networks, thereby maximizing transfer efficiency and minimizing the transfer time.

BRIEF DESCRIPTION OF THE DRAWINGS

FIG. 5 is a view showing a protocol structure used in the LAN system shown in FIG. 4;

FIG. 13 is a flow chart for explaining an operation of the network interface unit (NIU) shown in FIG. 4;

DETAILED DESCRIPTION OF THE PREFERRED EMBODIMENTS

A local area network (LAN) system according to the present invention will be described with reference to the accompanying drawings.

Figure 16:
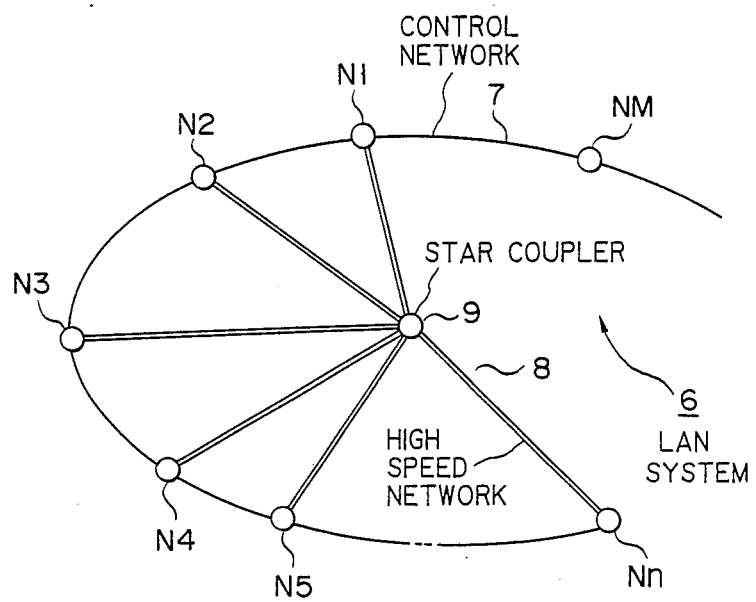
FIG. 16 is a view showing the configuration of the LAN system shown in FIG. 4.

The system configuration of the LAN system according to a first embodiment will be described with reference to FIG. 16. The system comprises networks 7 and 8, a plurality of nodes N1 to Nn, and network manager MM, as shown in FIG. 16. Network 8 can perform high-speed data transmission and comprises, e.g., optical fiber cables. Network 7 has a lower transmission rate than that of network 8 and comprises, e.g., coaxial cables.

Figure 1:
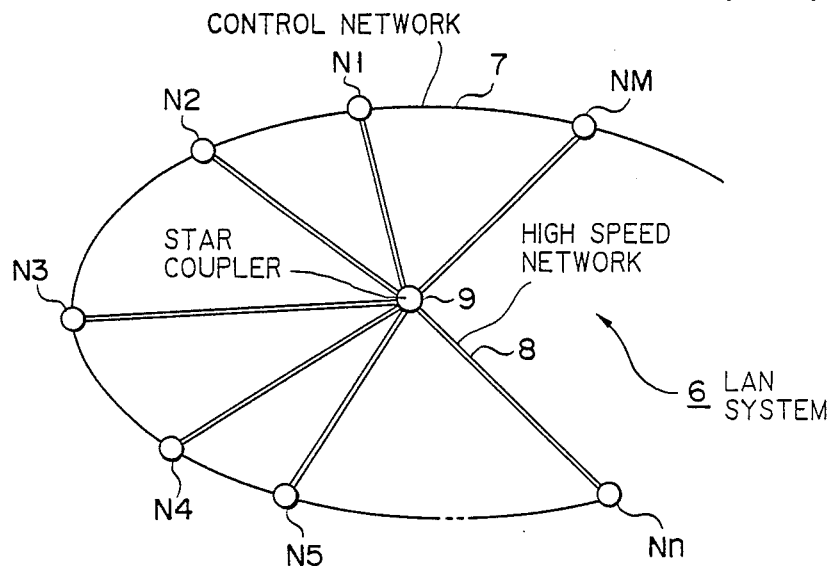
FIG. 1 is a schematic view showing a configuration of a conventional local area network (LAN) system.
Figure 2:
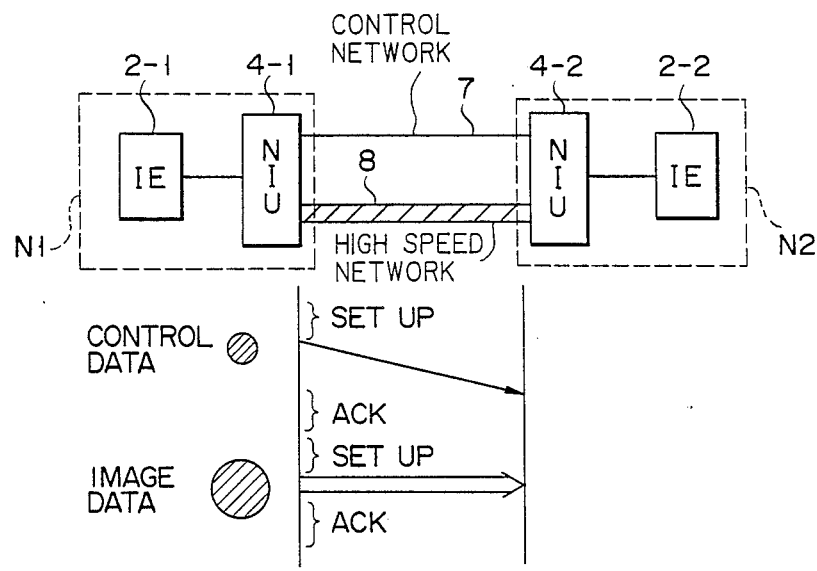
FIG. 2 is a view for explaining a conventional message transmission scheme.
Figure 3A:
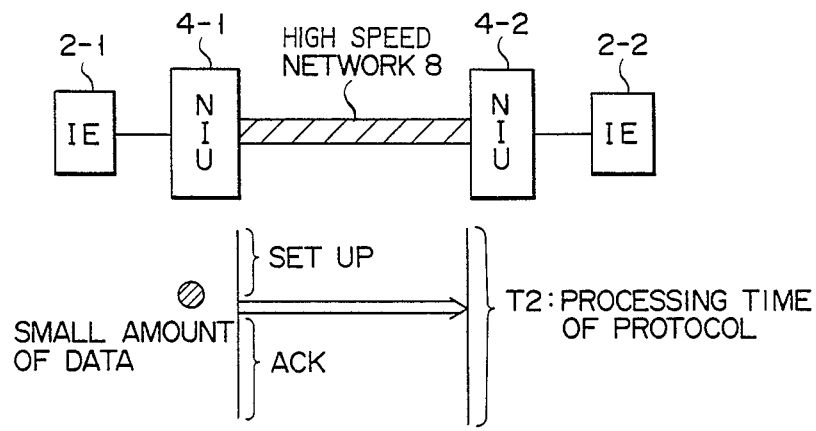
FIGS. 3A to 3D are views for explaining changes in protocol processing time on the basis of the message sizes.
Figure 3B:
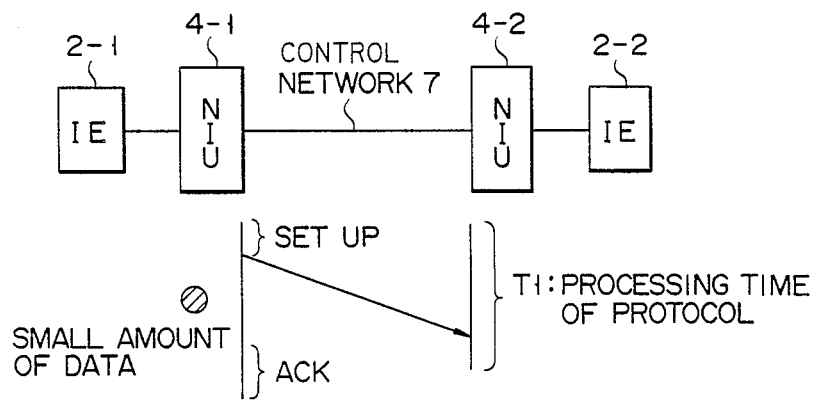
Figure 3C:
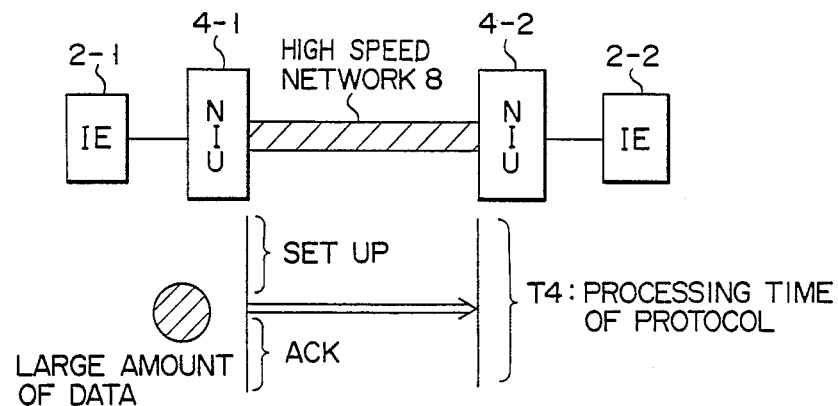
Figure 3D:
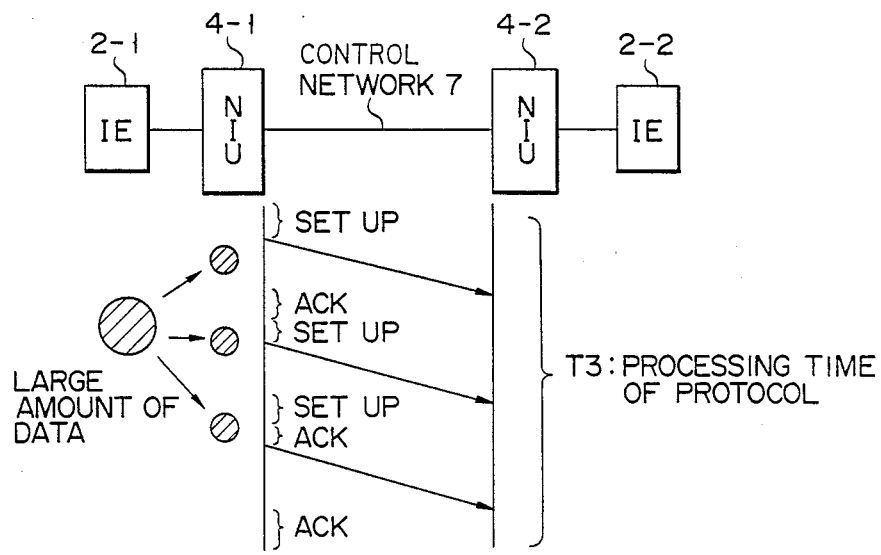
Figure 4:
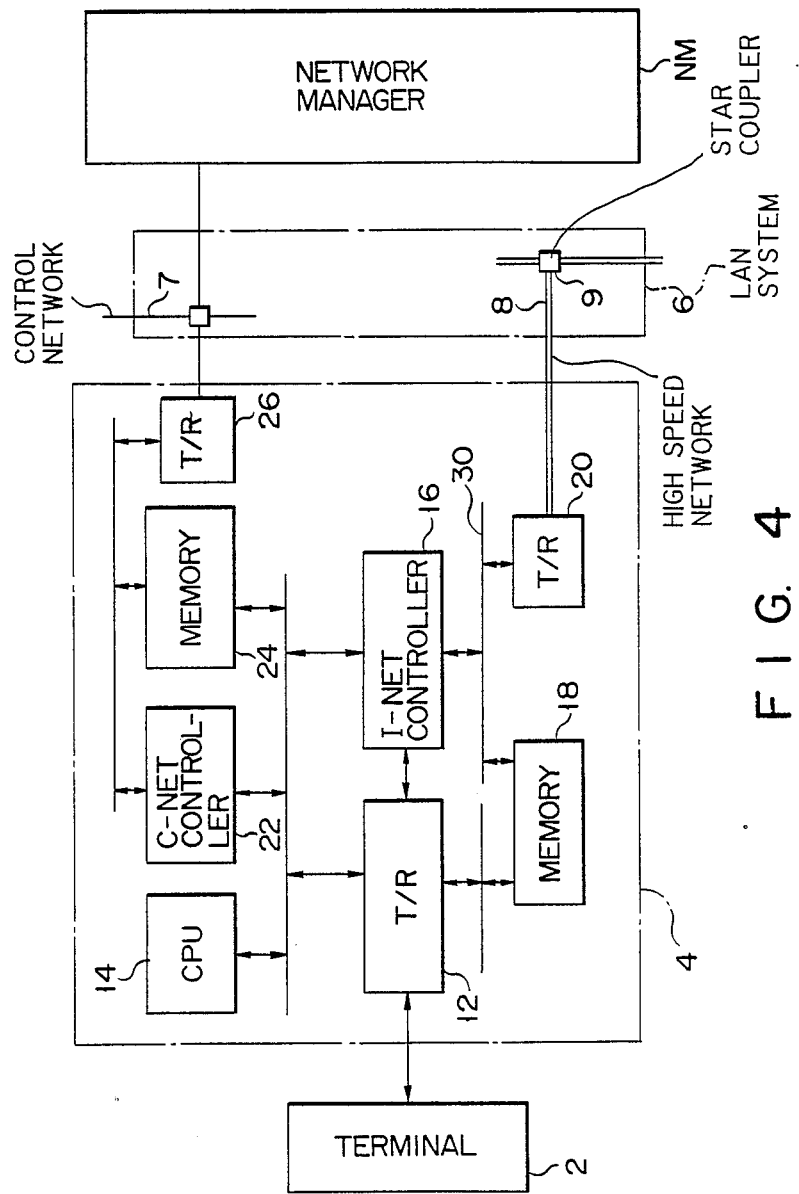
FIG. 4 is a block diagram of a network interface unit used in the LAN system according to a first embodiment of the present invention.
Figure 6:
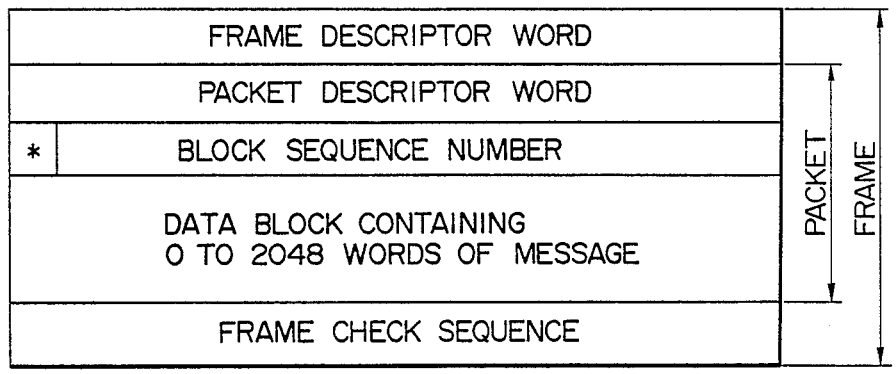
FIG. 6 is a view for explaining a packet formatted by ACR-NEMA.

FIG. 4 shows the node configuration. Referring to FIG. 4, each node comprises at least one data terminal 2 and network interface unit (NIU) 4. As shown in FIG. 5, terminal 2 has protocol 101-1 having a hierarchical structure of the A1 to An levels. Data communication is performed between terminal 2 and NIU 4 by packet switching on the basis of ACR-NEMA. In order to send a message in the ACR-NEMA, terminal 2 divides the message into a plurality of data blocks each having a predetermined number of bytes. A packet descriptor word and a block sequence number are added to the data block to format a packet, and a frame descriptor word and a frame check sequence are added to the packet to format a frame, as shown in FIG. 6. The frame is sent from terminal 2 to NIU 4. A last data block flag field is present at the beginning of the block sequence number, and the state of the flag indicates if this data block is the last data block.

The arrangement of NIU 4 will be described with reference to FIG. 4. Referring to FIG. 4, NIU 4 comprises CPU 14, buffer memories 24 and 18, I-net controller 16, C-net controller 22, and transceivers (T/Rs) 12, 20, and 26.

CPU 14 controls the overall operation of NIU 4 and functionally comprises a size detection section for detecting the size of the message sent from terminal 2, a detection section for detecting a packet size of a packet to be transmitted to another NIU 4, a network selection section for selecting a network used in accordance with a detection result of the size detection section, and a communication control section for determining a protocol for data communication between its own node and another node and for controlling transfer of control data such as a send request, a receive permission, and acknowledgement.

Transceiver 12 exchanges a packet with terminal 2 under the control of CPU 14. The received packet is stored in memory 24 or 18. Transceiver 26 exchanges control data and a small amount of data with other NIUs through network 7 under the control of C-net controller 22. Transceiver 20 exchanges a large amount of data with other NIUs through network 8 under the control of I-net controller 16. As shown in FIG. 5, CPU 14 has first hierarchical protocol 102-1, second hierarchical protocol 103-1, and third hierarchical protocol 104-1. First hierarchical protocol 102-1 corresponds to protocol 101-1 of terminal 2 and is constituted by a hierarchical structure having the A1 to AI intermediate levels.

Second hierarchical protocol 103-1 is a protocol for transferring a small amount of data and has a hierarchical structure of the B1 to Bj levels. For example, it is a CSMA/CD scheme standardized in IEEE802.3. The second hierarchical protocol occupies or releases the transmission channel in units of packets in accordance with the packet switching scheme. The time required for occupying the transmission channel can be short. A message stored in memory 24 is read out by C-net controller 22 and is converted by second hierarchical protocol 103-1. The converted message is output from transceiver 26 to a channel in low-speed network 7 under the control of C-net controller 22. Control data output from CPU 14 is similarly processed.

Third hierarchical protocol 104-1 is a protocol for transferring a large amount of data and has a hierarchical structure of the C1 to Ck levels. Third hierarchical protocol 104-1 occupies the transmission channel according to packet switching. Therefore, it takes a long period of time to occupy the transmission channel. Third hierarchical protocol 104-1 has three phases of data transmission. A request for establishing the communication channel is output in phase 1. Data is transmitted through the channel in phase 2. The right of using the channel is canceled in phase 3. A packet read out from memory 18 and converted according to third protocol 104-1 is controlled by I-net controller 16 and output to a channel in high-speed network 8. NIU 4-1 receives the message from terminal 2-1 through first hierarchical protocol 102-1, and the transmitted message is converted by second- or third hierarchical protocol 103-2 or 104-1. The converted message is sent to network 6.

NIU 4-2 connected to the plurality of networks 7 and 8 has the same arrangement as that of NIU 4-1. The CPU of NIU 4-2 has protocols 102-2, 103-2, and 104-2 which have the same hierarchical structures as those of CPU 14. For example, second hierarchical protocol 103-2 of NIU 4-2 is connected to second hierarchical protocol 103-1 of NIU 4-1 through network 7, and third hierarchical protocol 104-2 is connected to third hierarchical protocol 104-1 of NIU 4-1 through network 8.

The packet received by transceiver 26 through network 7 is stored in memory 24 under the control of controller 22. The packet received by transceiver 20 through network 8 is stored in memory 18 under the control of controller 16. Subsequently, the message stored in memory 18 or 24 is converted into ACR-NEMA through protocol 102-2 and is sent to terminal 2-2 by transceiver 12.

The principle of the present invention will be described prior to a description of the operation of the first embodiment below.

Assume that a message such as medical data including a large amount of data and a small amount of data is to be sent from terminal 2-1 to terminal 2-2 through NIUs 4-1 and 4-2. A total transfer time from starting of sending of the message from terminal 2-1 to the end of reception at terminal 2-2 is given as $T_{TR}$. Time $T_{TR}$ is determined by the following five factors:

1. Transmission rate between the terminal and the NIU: $V_A$
2. Packet data capacity: $C_{BF}$
3. Transmission rate of the network: $V_N$
4. Setup time of the network: $T_{SU}$
5. Data amount of the message: SI There are mainly two message transfer cases as follows: (A) the transfer time between the terminal and the NIU is longer than that between the NIUs and the amount of data of the message is small; and (B) the transfer time between the terminal and the NIU is shorter than that between the NIUs and the amount of data is large.

Total transfer time $T_{TR}$ of case (A) is given as follows:

$$T_{TR}=(SI/V_A)+(C_{BF}/V_N)+T_{SU}+(C_{BF}/V_A) \tag{1}$$

Total transfer time $T_{TR}$ of case (B) is given as follows:

$$T_{TR}=(SI/C_{BF})[(C_{BF}/V_N)+T_{SU}]+2(C_{BF}/V_A) \tag{2}$$

Utilization efficiency E of the network is defined as follows:

$$E=(C_{BF}/V_N)/[T_{SU}+(C_{BF}/V_N)] \tag{3}$$

Figure 7:
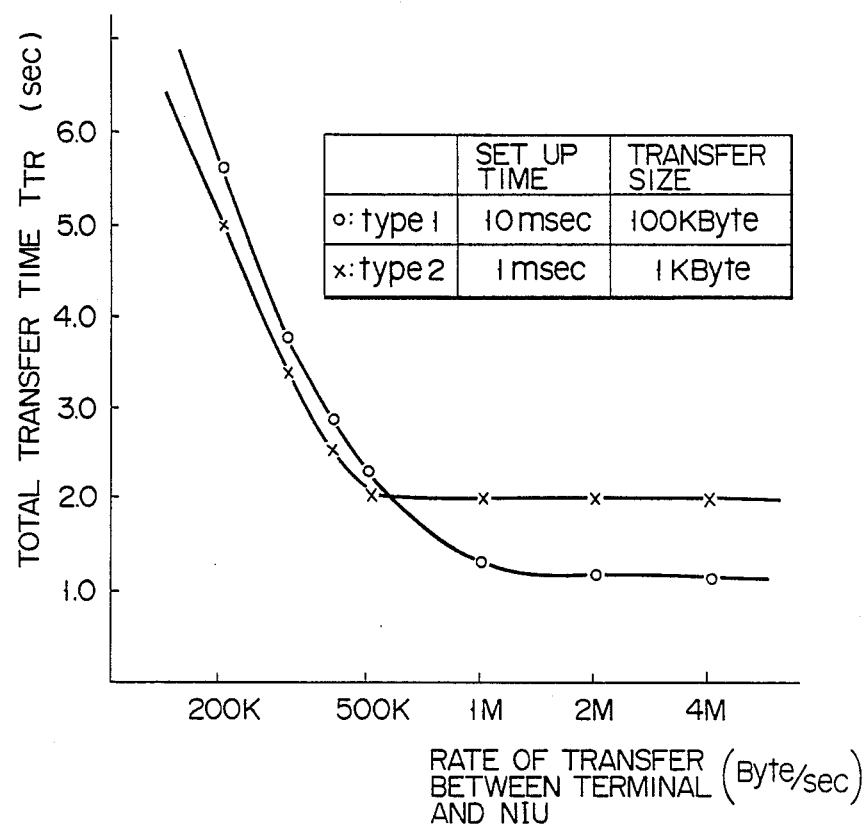
FIG. 7 is a graph showing the relationship between the transmission rate between the terminal and the NIU and the total transfer time.

The relationship between the total transfer time and transfer rate between the terminal and the NIU is shown in FIG. 7. As is apparent from FIG. 7, when the transfer rate is low, the total transfer time of type 2 is short. However, when the transfer rate is high, the total transfer time of type 1 is short. More specifically, a message having a small amount of data is to be transmitted by a protocol having a short setup time at a low transfer rate, while a message having a large amount of data is to be transmitted by a protocol having a large transfer size regardless of the setup time, thereby decreasing the transfer time. For example, in a system such as a medical image data interpolation communication system in which the data capacity of the message is greatly changed in a wide range, one or more protocols, e.g., two protocols are prepared, and the prepared protocols are to be selectively used in accordance with given conditions so as to achieve data transfer at high speed.

Figure 8:
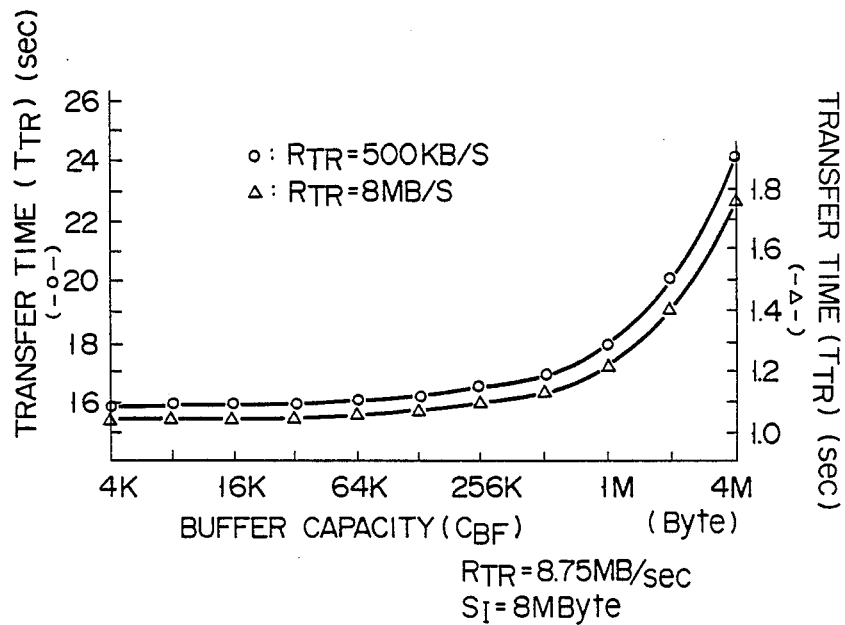
FIG. 8 is a graph showing the relationship between the buffer size and the transfer time.
Figure 9:
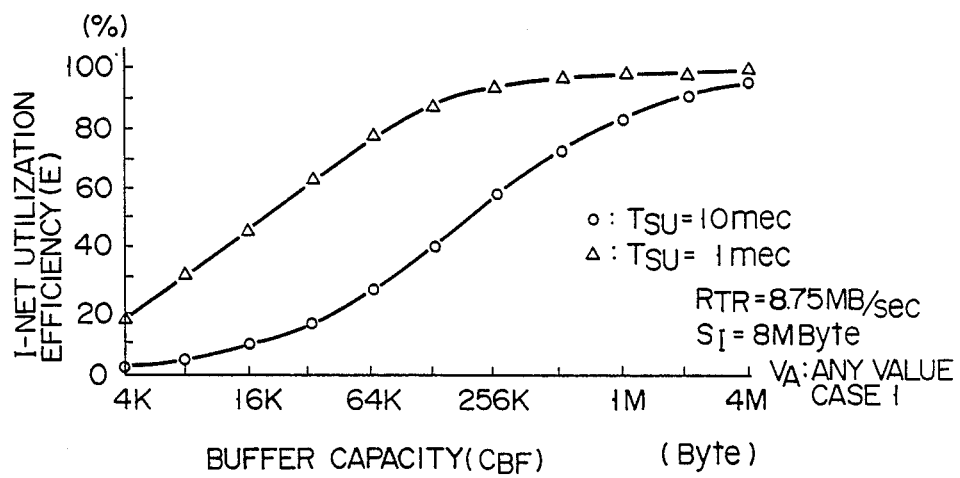
FIG. 9 is a graph showing the relationship between the buffer size and high-speed network utilization efficiency.

FIG. 8 shows the relationship between the total transfer time and the size (buffer capacity) of the packet in transmission between the NIUs, and FIG. 9 shows the relationship between the data capacity (buffer capacity) of the packet in transmission between the NIUs and the utilization efficiency of the network. According to FIGS. 8 and 9, if the networks have identical transfer rates, a decrease in packet size required for transmitting data every cycle allows a decrease in total transfer time, as shown in FIG. 8. In this case, however, since network efficiency is degraded, as shown in FIG. 9, the buffer capacity cannot be very small. When the network is not often used, the packet size can be decreased. When the load imposed on the network is increased, the packet size is to be increased and thereby the load on the network can be decreased. Therefore, the transfer rate of the message is to be dynamically controlled in accordance with network utilization efficiency.

The operation of the first embodiment will be described with reference to FIG. 10.

First, an operation for transferring a message will be described. In order to transfer a message from terminal 2-1 to terminal 2-2, a connection request (CONN.REQ) is sent from terminal 2-1 to transceiver 12 in NIU 4-1. The connection request input to NIU 4-1 is stored in memory 24. C-net controller 22 in NIU 4-1 causes transceiver 26 to output a connection request for NIU 4-2 through network 7. This connection request is received by transceiver 26 in NIU 4-2 and stored in memory 24. At the same time, this request is output to terminal 2-2.

If terminal 2-2 is ready, a connection indication (CONN.IND) in a direction opposite to that of the connection request is output from terminal 2-2. When the connection indication is received by NIU 4-2, NIU 4-2 sends the connection indication to terminal 2-1 through network 7 and NIU 4-1.

When terminal 2-1 receives the connection indication, a send request (SEND.REQ) is transmitted for terminal 2-2. Terminal 2-1 divides the message into a plurality of packets and sends the packets to NIU 4-1 in accordance with the ACR-NEMA. The send request is sent to terminal 2-2 through network 7 as a leading packet in the same manner as the connection request. When a packet having a predetermined amount of data is sent from terminal 2-1 to NIU 4-1, NIU 4-1 successively sends the packets to NIU 4-2 through network 8 in accordance with the protocol between NIUs 4-1 and 4-2. The packets received by NIU 4-2 are sent to terminal 2-2 in accordance with the ACR-NEMA.

When the message is entirely transferred, a send response (SEND RESP.) is sent back from terminal 2-2 to terminal 2-1. When terminal 2-1 receives the send response, terminal 2-1 sends a disconnection request (DISCONN.REQ) to terminal 2-2. Terminal 2-2 sends a disconnection indication (DISCONN.IND) to terminal 2-1 upon reception of the disconnection request. When terminal 2-1 receives the disconnection indication, the message has been completely sent from terminal 2-1 to terminal 2-2.

Figure 10:
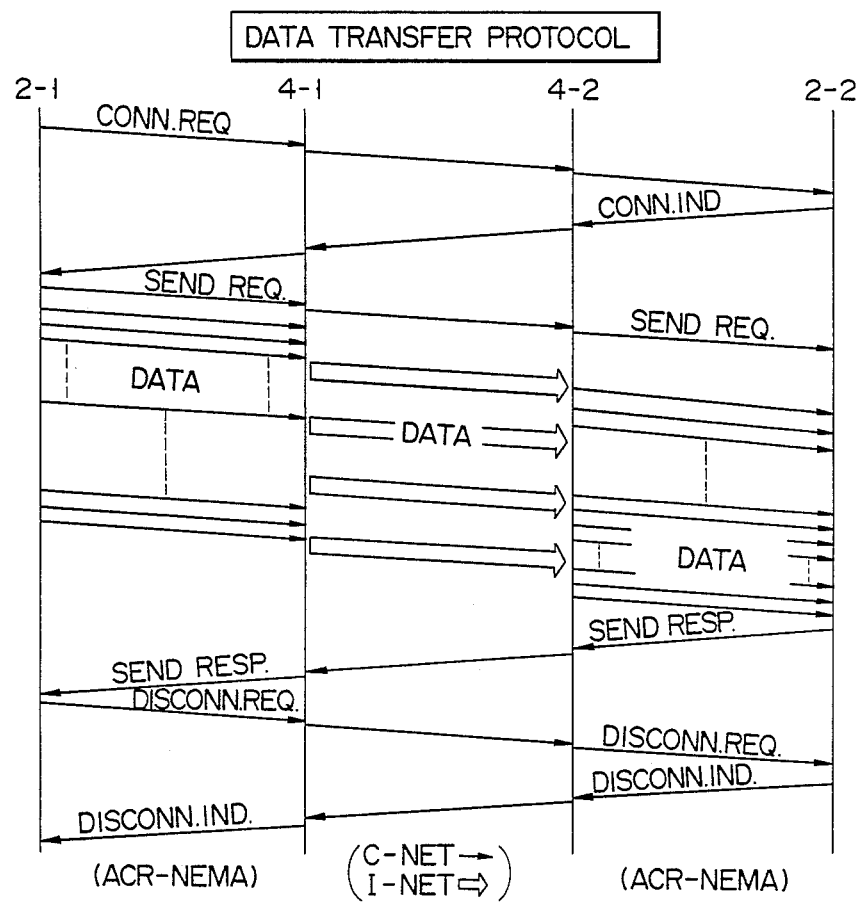
FIG. 10 is a sequence diagram showing the operations in message transfer.
Figure 11:
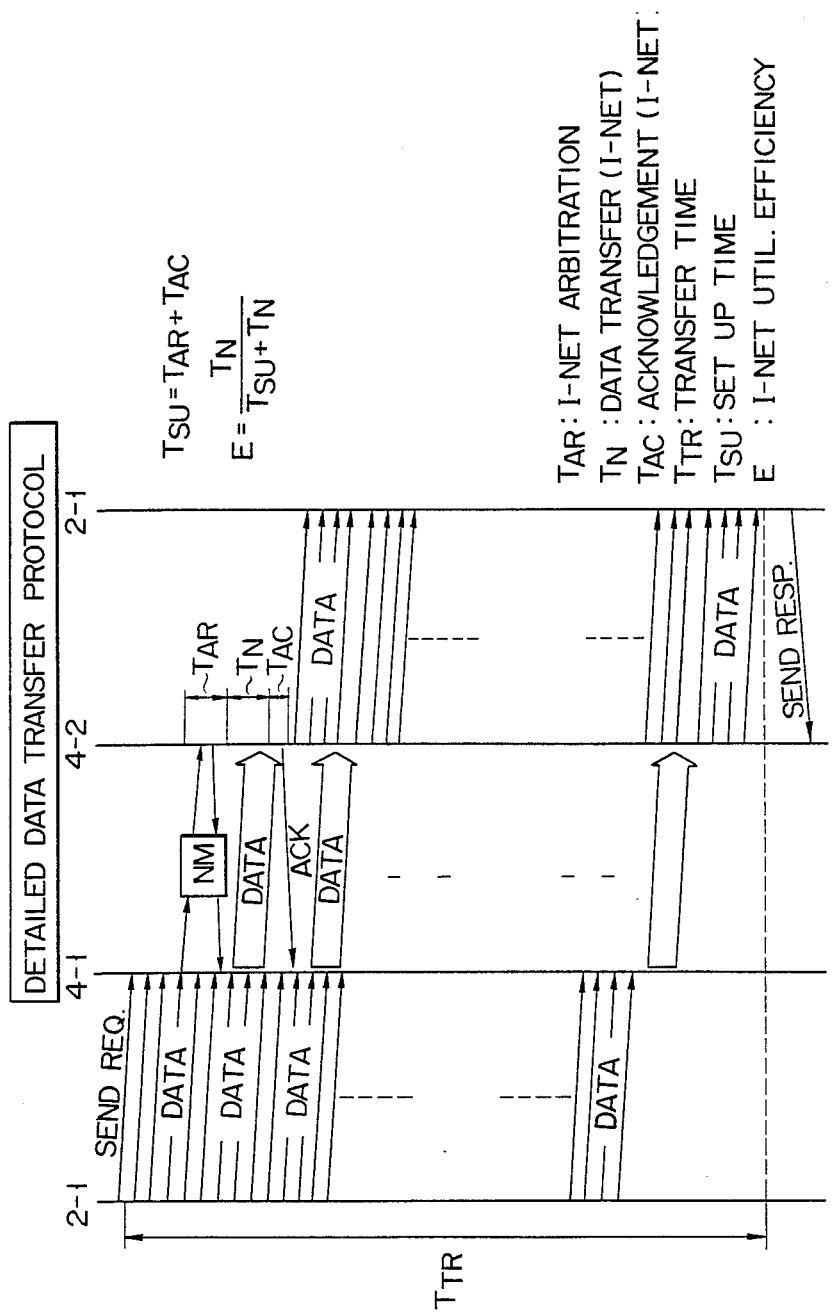
FIG. 11 is a view showing the detailed sequence of FIG. 10.

A "send" portion of the data packet in FIG. 10 is shown in detail in FIG. 11. The send request (SEND REQ.) including type of message (e.g., image data or other data) and a message size is as a control message sent from terminal 2-1 in accordance with the ACR-NEMA. When NIU 4-1 receives a send request from terminal 2-1 by means of transceiver 12, the corresponding packet is stored in memory 24. The message size written in the send request is detected by a size detection section in CPU 14. A network selection section determines on the basis of the detection result whether network 7 or 8 is to be used and outputs a control instruction to controller 16 or 22 in accordance with the detected message size. A communication control section determines a packet size for sending between the NIUs and a protocol in accordance with the detection result of the detector.

Meanwhile, packets are successively sent from terminal 2-1 subsequently to the send request. When the network selection section determines that network 8 is to be used and when the packet is stored in memory 24 up to the packet size determined by the communication control section, the packets of the subsequent packets are stored in memory 18. If it is detected that the message is a small size, the packets is normally stored in memory 24.

CPU 14 causes C-net controller 22 to output a channel establishment request to network manager NM. The channel establishment request includes a packet size. Manager NM manages to determine whether network 8 can be used. A node which is going to use network 8 outputs the channel establishment request every time it requires to use network 8. When manager NM receives the channel establishment request, the receive request including the packet size is output from manager NM to NIU 4-2 to check whether the request can be accepted. If the request can be accepted, NIU 4-2 sends a receive permission to manager NM, and manager NM sends the send permission to NIU 4-1. In this manner, a channel is established between NIUs 4-1 and 4-2. A communication control section counts the time until the send permission is reached from the request is output.

NIU 4-1 uses a predetermined packet size as the packet size required for sending the packet to NIU 4-2. In order to send the leading packet, the channel establishment request including the predetermined packet size is sent to manager NM to check if network 8 is being used. At the same time a detection section counts the time between generation of the channel establishment request and reception of the send permission, thereby checking the load of network 8. If network 8 is overloaded, the packet size for the next packet transfer cycle is increased although the transfer time is prolonged, thereby improving utilization efficiency of the network. However, if the load of network 8 is not heavy, the protocol is changed to decrease the packet size and increase the transfer rate, although the utilization efficiency is degraded.

When data having a size determined in accordance with the counted time is stored in NIU 4-1, NIU 4-1 sends the data as a packet to NIU 4-2 in accordance with a designated protocol. When NIU 4-2 receives the data, NIU 4-2 sends back acknowledge data to NIU 4-1. NIU 4-2 divides the data in a plurality of data blocks, and sends the data block to terminal 2-2 in accordance with the ACR-NEMA. The first packet between NIUs 4-1 and 4-2 is output from memory 24 to network 8 by transceiver 20 through I-net controller 16. The subsequent packets are output from memory 18 to network 8 by transceiver 20 through I-net controller 16. The above operation is repeated until all data are completely sent.

When all data are sent, terminal 2-2 sends back a send response (SEND RESP.) to terminal 2-1 through NIUs 4-1 and 4-2. Terminal 2-2 outputs the disconnection request (DISCONN.REQ.) to terminal 2-2 through NIUs 4-1 and 4-2. Terminal 2-2 having received the disconnection request sends back a disconnection indication (DISCONN.IND.) to terminal 2-2 through NIUs 4-1 and 4-2. The data is thus transferred from terminal 2-1 to terminal 2-2.

In the above description, message length detection is performed by checking the message length data written in the send request. Data representing the type of data is also written in the send request. The message length may also be determined by the type of message but not by the message length data. In the above embodiment, after the packet data having the size of one transfer cycle is stored in memory 24, the subsequent packet data is stored in memory 18. However, if the packet data is detected to be a large amount data, the subsequent packet data may be stored in memory 18 and the packet data stored in memory 24 may also be transferred to memory 18, thereby formatting the packet.

Figure 12:
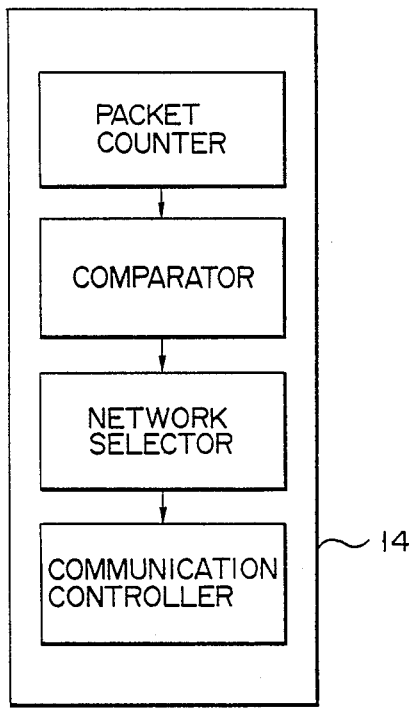
FIG. 12 is a diagram obtained by expressing the CPU in functional blocks.

The message length can be checked by counting the number of packets. In this case, the size detector (detection section) includes a packet counter and a packet count comparator, as shown in FIG. 12. The packet counter has a function for counting the number of packets received from terminal 2-1. More specifically, the packet counter reads out the channel number and the contents of the last data block flag field from each packet output from terminal 2-1 and stored in memory 24 and counts the packets in a software manner until the packet including the set last data block flag is found. The packet count comparator compares the count of the packet counter with predetermined reference value n. A comparison result is sent to the selector (the network selection section). The selector sends a selection control signal to network controllers 16 and 22 on the basis of the comparison result of the packet count comparator. Therefore, selection control of the network used in this packet transfer is performed.

The operation will be described with reference to a flow chart in FIG. 13.

Figure 14A:
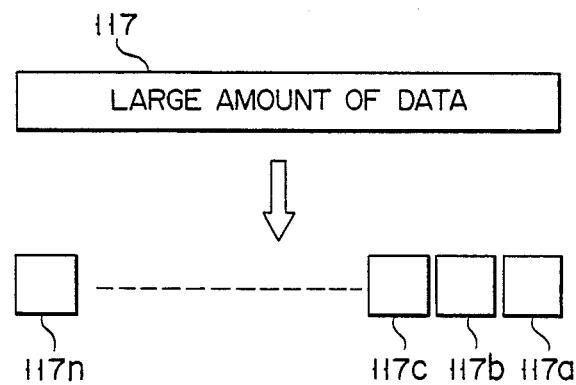
FIGS. 14A and 14B are views for explaining the flow chart shown in FIG. 13.
Figure 14B:
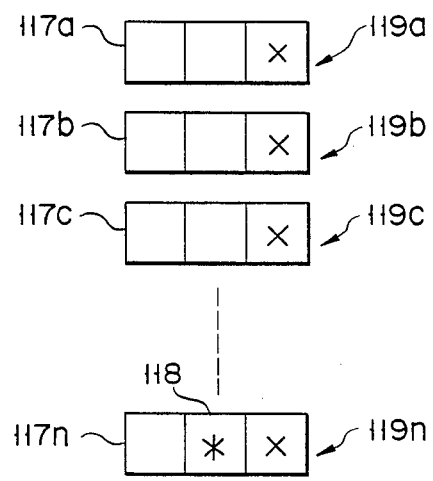

Terminal 2-1 performs data communication by packet switching. When data is to be sent, a large amount of message 117 is divided into data blocks 117a, 117b, 117c, . . . , 117n each having a plurality of bytes, as shown in FIG. 14A. Channel numbers X are suffixed to the blocks, respectively, as shown in FIG. 14B. Mark "*" is given in last data block flag 118 in last block 117n. The resultant packets are sent in an order of 119a, 119b, . . . 119n to NIU 4-1. The sent packet is received by transceiver 12 in step S1. Received packet 119a is written in memory 24 by transceiver 12 in step S2. CPU 14 reads out the channel number and the last block flag of the packet from memory 24 in step S3 and determines whether the last data block flag (*) is set. If NO in step S3, the packet is not the last packet. "1" is added to variable i in the soft counter in step S6. The operations in steps S1 to S4 and step S6 are repeated for every packet.

CPU 14 determines in step S7 whether condition i≧n is obtained. This determination is performed by the packet count comparator in CPU 14. If the count i of the packet counter has not reached predetermined reference value n, the flow returns to step S1. The next packet (i.e., packet 119b in this case) is sent from terminal 2-1 to NIU 4-1. In this manner, the operations in steps S1 to S4 and steps S6 and S7 are repeated.

If CPU 14 determines in step S4 that the last block flag (*) is set, the count of the packet counter has not reached predetermined reference value n. In other words, the message length is shorter than the data length determined by reference value n. In step S5, CPU 14 determines that the message is to be sent through network 7. If CPU 14 determines in step S4 that the last flag is set, channel number X and parameter "L" are sent from the detector to the selector and the selector sends a selection control signal to C-net controller 22. As a result, all packets having channel numbers X in memory 24 are sent to network 7 through transceiver 26 under the control of controller 22.

If CPU 14 determines in step S7 that condition i≧n is established, the message length is detected to be longer than the data length determined by predetermined reference value n. CPU 14 determines in step 8 that the message is to be sent through network 8. If YES in step S7, channel number X and parameter H are sent from the detector to the selector. The selector then outputs the selection control signal to I-net controller 16. Controller 16 transfers all packets having channel numbers X in memory 24 to memory 18. Subsequent packets having channel numbers X and to be received from transceiver 12 are written in memory 18. The packets with channel numbers X reformatted under the control of controller 16 are sequentially read out from memory 18 and are sent to network 8 through transceiver 20.

In the above embodiment, the message size is detected by counting the number of packets having the identical channel numbers X. If the message size has small, it is sent through network 7. However, if the message is long, it is sent through network 8. A plurality of networks having different data transmission rates can be effectively utilized. In addition, the message size can be monitored by the number of packets, as described above.

The present invention is not limited to the particular embodiment described above. For example, in the above embodiment, the soft packet counter and the soft packet count comparator are assigned in CPU 14. However, the packet counter and the packet count comparator may be arranged by hardware. If a hard counter and a hard comparator are used, these circuit components can be arranged in transceiver 12. Transceiver 12 comprises a packet counter constituted by a counter with a transceiver function and a packet count comparing means constituted by a comparator. The comparison result from the packet count comparator is sent to the network selection controller in CPU 14 and is used for network selection control in the same manner as in the above embodiment.

Figure 15:
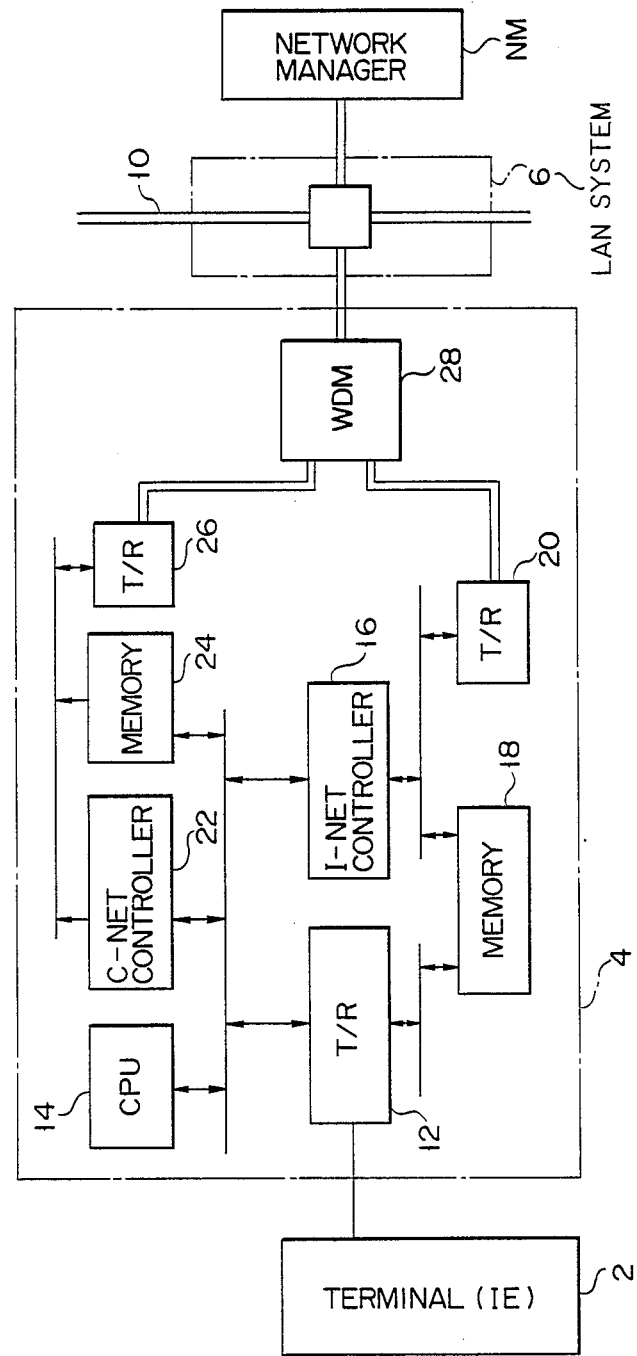
FIG. 15 is a block diagram of a network interface unit used in the LAN system according to a second embodiment of the present invention.

FIG. 15 is a block diagram showing another configuration of a LAN system. The main part of the LAN system shown in FIG. 15 is the same as that in FIG. 4. The LAN system in FIG. 15 differs from that in FIG. 4 in that transceiver 26 and 20 output data to optical fibers and photomultiplexer 10 for coupling or decoupling optical data output from transceivers 20 and 26 is provided. In this manner, the NIU is connected to network 6 through optical fiber cable 8. Therefore, the data is sent by dividing the band. A low-speed channel corresponds to network 7, and a high-speed channel corresponds to network 8.

The operation of the embodiment shown in FIG. 15 is the same as that in FIG. 10, and its detailed description will be omitted.

According to the present invention as described above, when a large amount of data and a small amount of data, which constitute, e.g., medical image data, are to be transmitted, one of a plurality of communication protocols is selected in accordance with the large or small amount of data. Data is transferred through the corresponding network, and transfer efficiency (words/sec) can be improved. In addition, the image data transfer time (sec/image data) can be minimized. The present invention is exemplified by the case wherein two types of protocols and the networks corresponding to them are prepared. However, the number of protocols may be increased in accordance with applications.

What is claimed is:

1. A local area network system for transferring a message from a first terminal to a second terminal at high speed, comprising:
   a first network;
   a second network;
   first network interface means, connected to said first and second networks and said first terminal, for receiving the message from said first terminal, for detecting a size of the message, and for selectively sending the message onto one of said first and second networks in accordance with the detected size of the message; and
   second network interface means, connected to said first and second networks and said second terminal, for selectively receiving the message from one of said first and second networks and for sending the message to said second terminal.

2. The system according to claim 1, wherein said first network interface means includes:
   receiving means for receiving the message from said first terminal;
   first sending means for sending the message onto said first network in accordance with an input first control instruction;
   second sending means for sending the message onto said second network in accordance with an input second control instruction;
   detecting means for detecting the size of the message; and network selecting means for selectively generating one of the first and second control instructions in accordance with the detected size of the message, and for outputting the first control instruction to said first sending means to activate said first sending means and the second control instruction to said second sending means to activate said second sending means;

wherein said detecting means includes counting means for counting the number of packets received by said receiving means, the message comprising a plurality of packets, and means for determining whether the number of packets counted exceeds a predetermined value, to detect the size of the message, and said network selecting means includes means for generating and outputting to said first sending means the first control instruction when said detecting means detects that the number of packets counted exceeds the predetermined value, and for generating and outputting to said second sending means the second control instruction when said detecting means detects that the number of packets counted in smaller than the predetermined value.

3. The system according to claim 2, wherein said receiving means receives a control message including message size data from said first terminal prior to the message, said detecting means includes means for detecting the size of the message from the message size data, said network selecting means includes means for generating a third control instruction in accordance with the reception of the control message by said receiving means, said second sending means includes means for sending the control message onto said second network in accordance with the third control instruction from said network selecting means, and said second network interface means includes means for receiving the control message from said second network and for transmitting the control message to said second terminal.

4. The system according to claim 2, wherein said receiving means receives a control message including message type data from said first terminal prior to the message, said detecting means includes means for detecting the size of the message from the message type data, said network selecting means includes means for generating a third control instruction. in accordance with the reception of the control message by said receiving means, said second sending means includes means for sending the control message onto said second network in accordance with the third control instruction from said network selecting means, and said second network interface means includes means for receiving the control message from said second network and for transmitting the control message to said second terminal.

5. A local area network system for transferring a message from a first terminal to a second terminal at high speed, comprising:
    a network;
    first network interface means, connected to said network and said first terminal, for receiving the message from said first terminal, for detecting a degree of congestion of said network prior to sending each packet of the message, for determining a packet size of each packet in accordance with the detected degree of congestion, and for sending the message of said packet size onto said network in units of packets;
    second network interface means, connected to said network and said second terminal, for receiving each packet of said packet size from said network and for sending the same to said second terminal.

6. The system according to claim 5, further comprising:
    a second network, to which said first and second interface means are connected; and
    network managing means connected to said second network, for outputting an establishment instruction to said second network interface means in accordance with an input establishment request from said first network interface means, and for outputting an establishment response to said first network interface means in accordance with an input establishment indication, and wherein
    said first network interface means further comprises means for generating and outputting to said network managing means the establishment request prior to sending each packet, for receiving the establishment response from said network managing means, and for detecting the degree of the congestion from a time period from generation of the request to reception of the response, and said second network interface means further comprises means for outputting the indication to said network managing means in accordance with the establishment instruction from said network managing means.

7. A method of transferring a message from a first terminal to a second terminal via one of the first and second networks, comprising:
    detecting a size of the message;
    selecting one of the first and second networks in accordance with the detected size of the message; and
    transmitting the message from the first terminal to the second terminal through the selected network;
    wherein said detecting step includes counting the number of first packets of the message from the first terminal, and determining whether the number of packets counted exceeds a predetermined value, to detect the size of the message.

8. The method according to claim 7, wherein said selecting step includes selecting the first network when it is detected that the number of packets counted exceeds the predetermined value, and the second network when it is detected that the number of packets counted is smaller than the predetermined value.

9. The method according to claim 7, further comprising receiving a control message including message size data from said first terminal prior to the message to transmit the control message to the second terminal, and wherein said detecting step includes detecting the size of the message from the message size data.

10. The method according to claim 7, further comprising:
    receiving a control message including message type data from said first terminal prior to the message to transmit the control message to the second terminal; and
    wherein said detecting step includes detecting the size of the message from the message type data.

11. The method according to claim 7, wherein said transmitting step includes:

detecting a degree of congestion of the selected network prior to transmitting each second packet in accordance with the detected degree of the congestion, and transmitting the message from the first terminal to the second terminal.

12. The method according to claim 11, wherein said detecting of the degree of the congestion includes detecting the degree of the congestion from a time period from generation of a channel establish request to establishment of a channel in the selected network.

* * * * *